United States Patent

Munesada et al.

Patent Number: 5,805,728
Date of Patent: Sep. 8, 1998

[54] EDGE LINE MEASURING METHOD

[75] Inventors: Nobumichi Munesada, Moriguchi; Yoshio Kanata, Nara; Michitaro Horiuchi, Hamakita; Hiroki Hoshiyama, Hamamatsu, all of Japan

[73] Assignee: Matsushita Electric Industrial Co., Ltd., Osaka-fu, Japan

[21] Appl. No.: 518,601

[22] Filed: Aug. 21, 1995

[30] Foreign Application Priority Data

Aug. 22, 1994 [JP] Japan .................................. 6-196827

[51] Int. Cl.⁶ .............................. G06K 9/46; G06K 9/66; G06K 9/48; G06K 9/36
[52] U.S. Cl. ......................... 382/199; 382/193; 382/291
[58] Field of Search .................................... 382/199, 195, 382/205, 286, 291, 200, 193

[56] References Cited

U.S. PATENT DOCUMENTS

| | | | |
|---|---|---|---|
| 3,587,046 | 6/1971 | Tanaka et al. | 382/200 |
| 4,876,729 | 10/1989 | Watanabe et al. | 382/199 |
| 5,119,439 | 6/1992 | Osawa et al. | 382/199 |
| 5,119,440 | 6/1992 | Duenyas et al. | 382/199 |
| 5,359,666 | 10/1994 | Nakayama et al. | 382/104 |
| 5,555,312 | 9/1996 | Shima et al. | 382/104 |

*Primary Examiner*—Joseph Mancuso
*Assistant Examiner*—Ha Tran Nguyen
*Attorney, Agent, or Firm*—Wenderoth, Lind & Ponack, L.L.P.

[57] ABSTRACT

A method for accurately obtaining, in a short period of time, the position and slope of a specific edge line, even when there are many extraneous points caused by dust and other such garbage or electrical noise around the edge line to be obtained. A window covering the area containing the desired edge line is set, and the area inside the window is scanned at a specific interval in a direction crossing the edge line so as to obtain specific image data. The coordinates of points indicating a change in brightness in the scanning direction are obtained as edge points. The area inside the window is divided into a group of rectangular subareas parallel to the edge line to be detected and at a predetermined pitch and size capable of containing the edge line. The subarea containing the greatest number of edge points is obtained, and the edge line is then estimated from the coordinates of the edge points in this subarea containing the greatest number of edge points.

8 Claims, 7 Drawing Sheets

EDGE LINE MEASURING METHOD

BACKGROUND OF THE INVENTION

1. Field of the Invention

The present invention relates to a method for measuring the position and slope of a specific edge line of a target object by way of, for example, a visual recognition apparatus used for the tasks of measuring, assembling, and inspecting during processes of manufacturing electronic devices.

2. Description of the Prior Art

There are many cases in which specific measuring, assembling, and inspecting tasks in the processes of manufacturing electronic devices have been automated by way of visual recognition apparatuses. What are usually measured by the visual recognition apparatus to accomplish these tasks are the coordinates of the intersection of two lines, or the distance between two parallel lines. In either case, however, the two edge lines of the recognition target are approximated by linear equations, and the intersection of the distance between the lines is obtained from the linear equations. To accomplish this, the primary function of the visual recognition apparatus is to accurately and reliably measure the position and slope of each edge line.

One edge line measurement method according to the prior art is described below with reference to FIGS. 4–5C.

Figure 4:
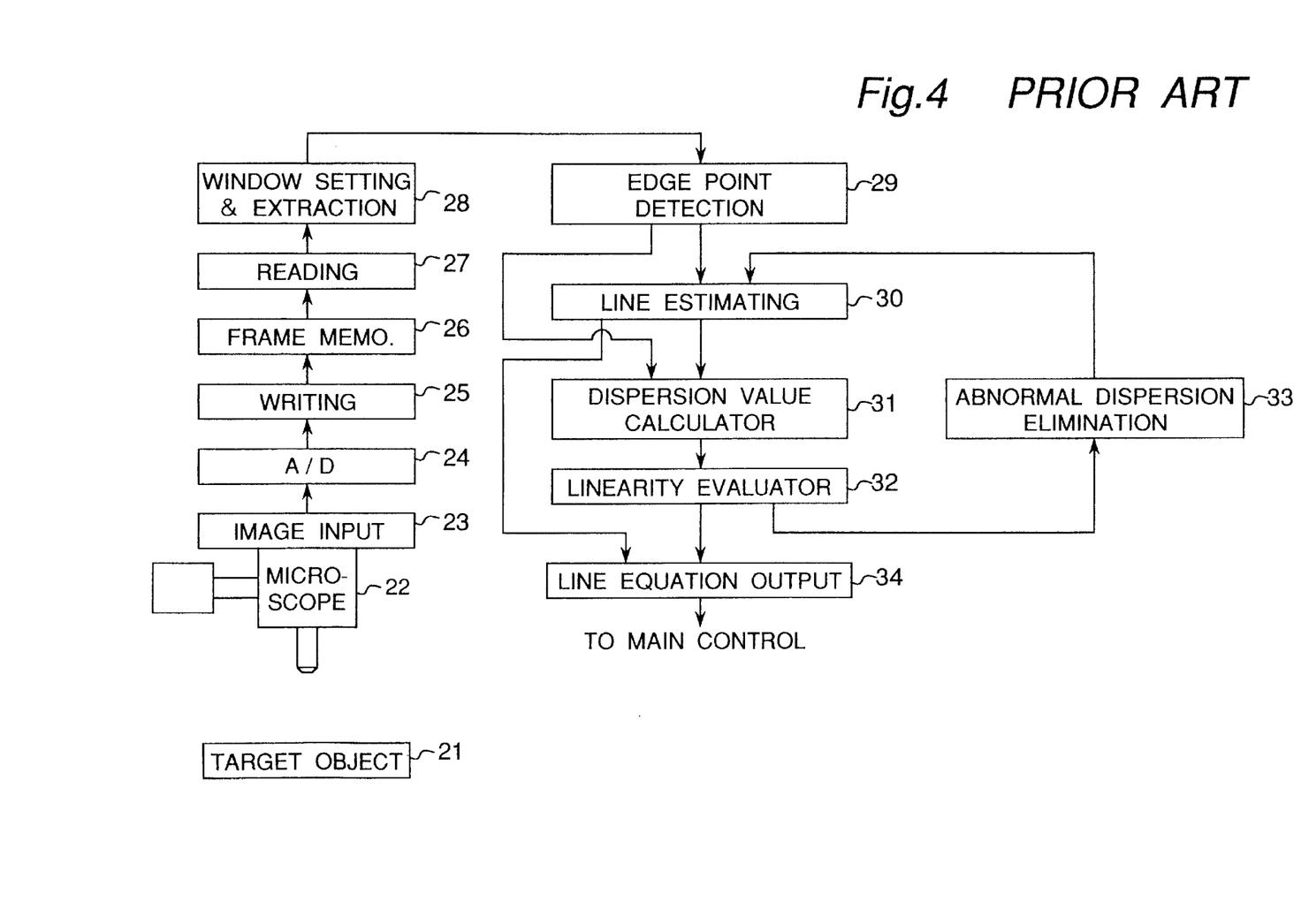
FIG. 4 is a block diagram of an edge line measuring apparatus according to the prior art.

FIG. 4 is a block diagram of the configuration of an edge line measuring apparatus according to the prior art. As shown in FIG. 4, an image input means 23 is disposed to the eyepiece of a microscope 22 used to capture the edge line of the target object 21 being measured. The image signal output by the image input means 23 is then converted to a digital signal by the A/D converter 24, and is then stored to the frame memory 26 by writing means 25. Window setting and extraction means 28 then extracts only the required image data from the frame memory 26 via reading means 27. Edge point detection means 29 then detects the edges from the read image data, and outputs the coordinate data of the extracted edges to line estimating means 30.

The line estimating means 30 estimates the lines based on the coordinate data of the edge points input thereto, and transfers the linear equation data to the dispersion calculator 31. The dispersion calculator 31 calculates the distance from the line candidate drawn according to this linear equation to each of the edge points in the subarea, and sends this distance data to the linearity evaluator 32.

The linearity evaluator 32 determines whether the distance from the line to any of the edge points is abnormally great based on the data supplied from the dispersion calculator 31, and outputs its determination to the abnormal dispersion elimination means 33 when an abnormal distance is detected. The abnormal dispersion elimination means 33 then eliminates the edge point farthest from the line, and instructs the line estimating means 30 to re-estimate the line based on the coordinate data of the remaining edge points. When the linearity evaluator 32 determines that the linearity of the line candidate is sufficient (does not detect any abnormal line-to-point distance) after looping through the abnormal dispersion elimination means 33 and repeating the evaluation as may be necessary, it outputs the linear equation to the line output means 34, which then outputs the linear equation to the main controller.

Based on this linear equation and the linear equation of the other edge line obtained in the same manner, the main controller then calculates the intersection of or the distance between the two lines.

The process of obtaining the linear equation in the edge line measuring apparatus above is described below with reference to FIGS. 5A–5C.

Figure 5A:
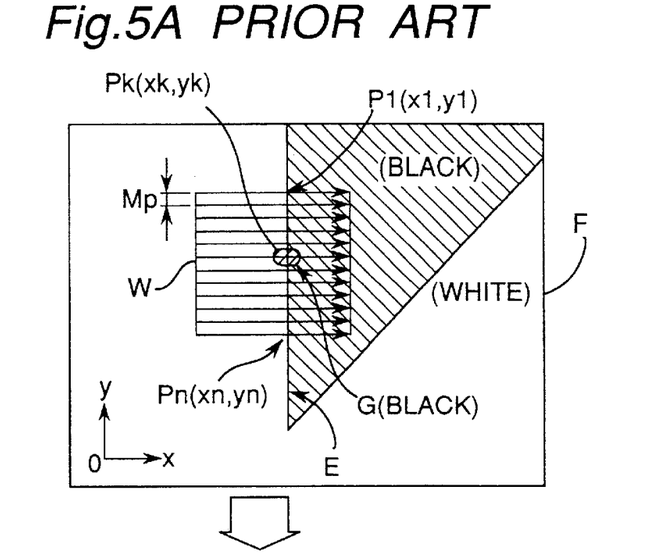
FIGS. 5A, 5B and 5C are diagrams used to describe the edge line measuring process of the prior art.

As shown in FIG. 5A, the window setting and extraction means 28 opens a window W within field of view F. This window W is opened in a manner such that it contains a specific edge line E of the target object 21, and such that it covers an area on both sides of the edge line. The window setting and extraction means 28 also draws n sampling lines, L1–Ln, at a certain interval Mp and in a direction crossing edge line E. The reading means 27 then reads the image data on each of the sampling lines, L1–Ln, from the frame memory 26; and the edge point detection means 29 detects, as the edge points, those points indicating a change in brightness, and obtains the coordinates $P_1(x_1, y_1)$-$P_n(x_n, y_n)$ of each of the edge points. Note that in the example shown in FIG. 5A dust or other extraneous information G ("garbage" below) is on sampling line $L_k$, an edge point $P_k$ $(x_k, y_k)$ is therefore not located on edge line E but on garbage G.

Figure 5B:
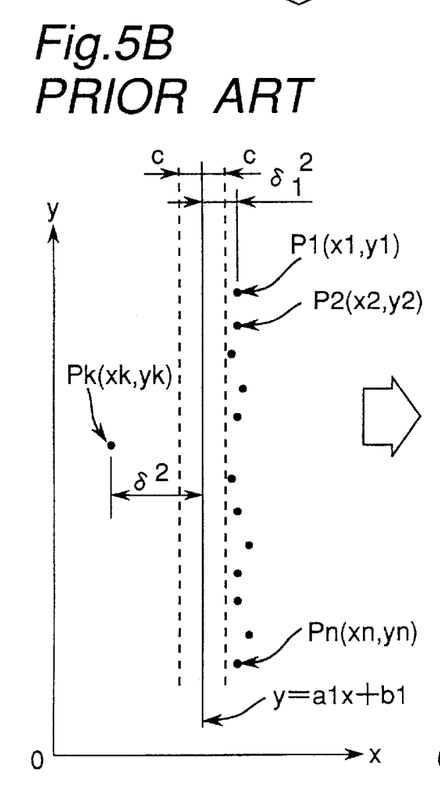
Figure 5C:
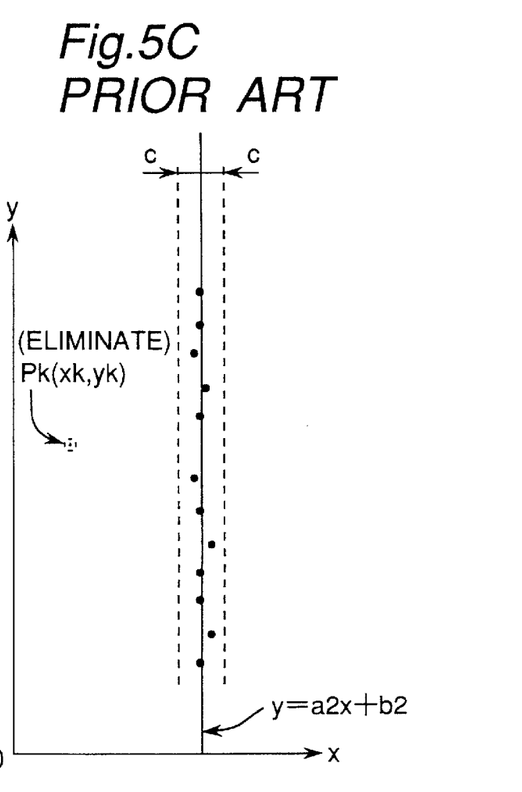

Next, as shown in FIG. 5B, the line estimating means 30 calculates line approximation equation $y=a_1 x+b_1$ using a least squares method based on the coordinate data $P_1(x_1, y_1)$-$P_n(x_n, y_n)$, and obtains the squares of the distance from the line drawn based on this line approximation equation to each of the edge points $P_1(x_1, y_1)$-$P_n(x_n, y_n)$, i.e., obtains $S_1^2$-$S_n^2$ expressing the dispersion of the edge points from the line candidate. The linearity evaluator 32 then determines whether each dispersion value is within the range of a predetermined value $C^2$. If there is an edge point outside this $C^2$ range, the linearity evaluator 32 determines the line candidate to lack sufficient linearity, and outputs its determination to the abnormal dispersion elimination means 33.

The abnormal dispersion elimination means 33 then deletes the edge point $P_k(x_k, y_k)$ farthest from the line drawn based on line approximation equation $y=a_1 x+b_1$, and instructs the line estimating means 30 to repeat the line approximation process using the remaining edge points.

The line estimating means 30 thus repeats line approximation using the same least-squares method but without using the deleted edge point $P_k(x_k, y_k)$. The line estimating means then obtains line approximation equation $y=a_2 x+b_2$ as shown in FIG. 5C, and obtains the dispersion of the remaining edge points, which no longer includes $P_k(x_k, y_k)$, from the line drawn according to line approximation equation $y=a_2 x+b_2$. When all dispersion values are within the range of $C^2$, the linearity evaluator 32 determines that the line candidate has sufficient linearity, and therefore outputs the result to the line output means 34. The line output means 34 then outputs the linear equation $y=a_2 x+b_2$ to the main controller.

Figure 6A:
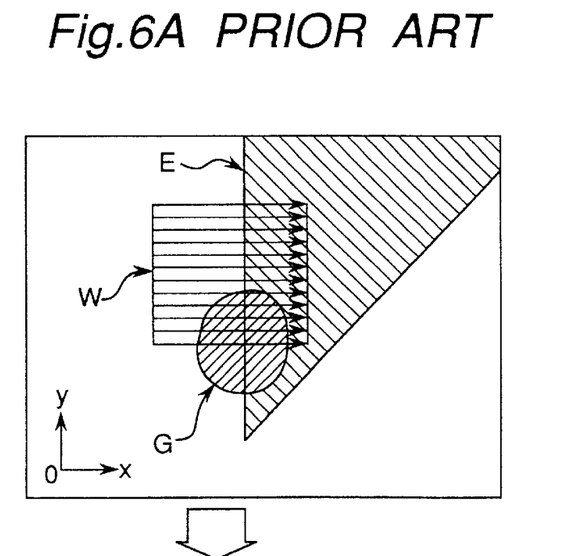
FIGS. 6A, 6B and 6C are diagrams used to describe one problem of the edge line measuring process of the prior art.
Figure 6B:
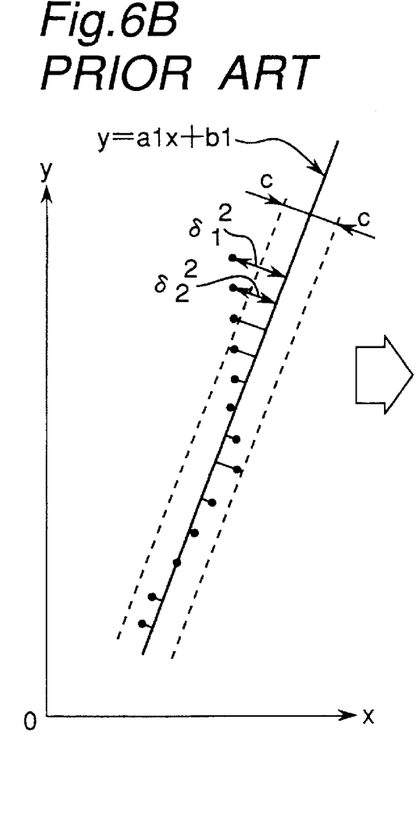
Figure 6C:
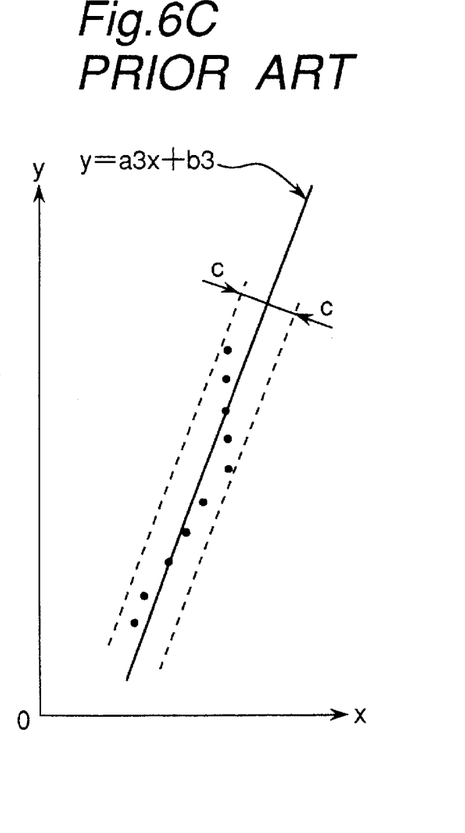

There is no problem with the method described above when there is only one or a few abnormal points resulting from garbage G as shown in FIG. 5A. However, when an abnormal spot on the edge line E caused by garbage G is large as shown in FIG. 6A, a linear equation $y=a_3 x+b_3$ having a different (wrong) slope is obtained. In addition, when there are many small spots caused by garbage G in the window W as shown in FIG. 7A, both the slope and the position of the obtained line $y=a_4 x+b_4$ are wrong.

In addition, when the contrast of the edge line E is low and these low contrast edge points are detected, small changes in brightness resulting from electrical noise are also detected even in areas where the edge points are black or white. It is therefore not possible to accurately extract the edge line in such cases.

Figure 7A:
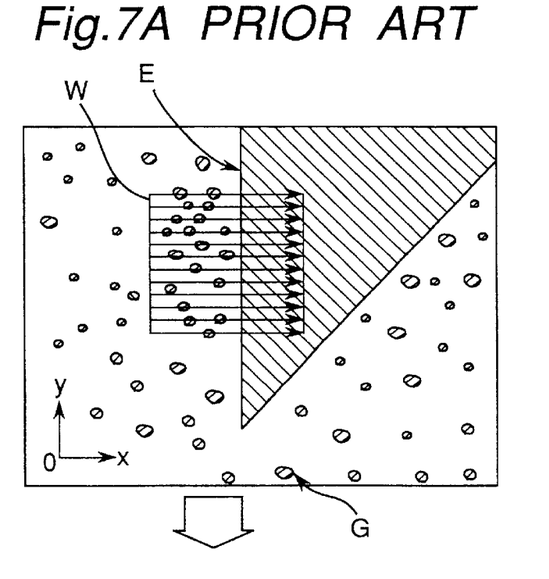
FIGS. 7A, 7B and 7C are diagrams used to describe another problem of the edge line measuring process of the prior art.
Figure 7B:
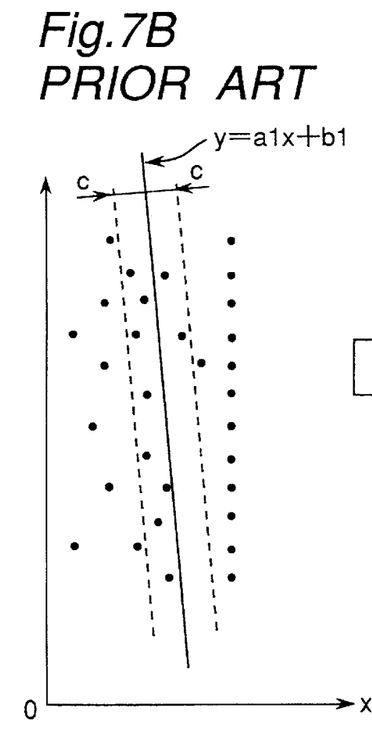
Figure 7C:
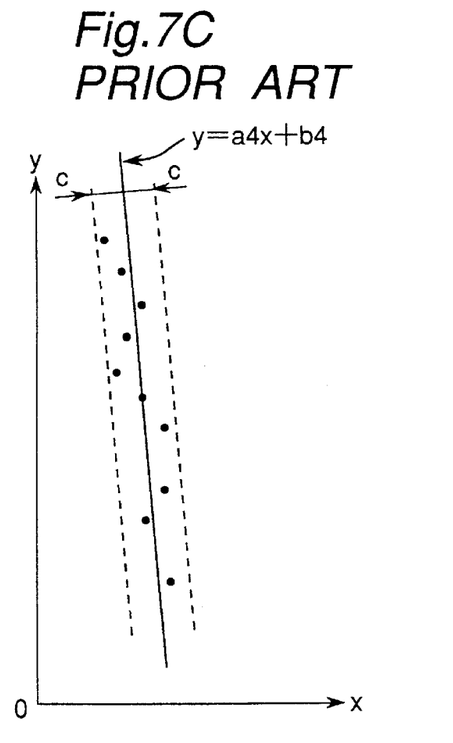

When it is repeatedly determined that the detected line has insufficient linearity, as occurs with the case shown in FIGS. 7A–7C, excessive time is also required for the measurement.

SUMMARY OF THE INVENTION

Therefore, an object of the present invention is to provide an edge line measuring method for accurately obtaining, in a short period of time, the position and slope of a specific edge line, even when there are many extraneous points around the edge line which is to be obtained. The extraneous points may be due to dust and other such garbage or electrical noise.

To achieve the aforementioned object, an edge line measuring method according to the present invention includes the following steps. A primary window is set which covers an area containing the edge line. Specific image data is extracted by scanning the area inside the primary window at a specific interval in a direction crossing the edge line. A change in brightness in the scanning direction is detected and coordinates of the point of the change in brightness are obtained and used as an indication of the location of an edge point of the edge line. A plurality of subareas are formed by dividing the area inside the primary window into rectangular blocks at a predetermined pitch capable of containing the edge line. A subarea containing the highest population of edge points is selected from the plurality of subareas. This subarea is called the highest edge point population subarea since it contains the greatest number of edge points. From the coordinates of the edge points in the highest edge point population subarea, an edge line is then estimated.

Additionally, a secondary window may be set inside the primary window. The secondary window is capable of containing the edge line and is narrower than the primary window. A plurality of mini-subareas may be formed by dividing the area inside the rectangular window into rectangular blocks at a predetermined pitch capable of containing the edge line.

Furthermore, when a group of subareas is defined, the subareas are preferably defined such that adjacent subareas overlap.

In addition, the change in brightness is detected by detecting the brightness change when the change in brightness exceeds a predetermined threshold value in the scanning direction.

The edge line measuring method according to the present invention also includes the following steps. The appropriateness of the estimated edge line is evaluated based on whether the distance from the estimated edge line to each of the edge points is within a predetermined range. The edge point farthest from the estimated edge line is eliminated, and the edge line is re-estimated from the coordinates of the remaining edge points.

By means of the edge line measuring method thus described, subareas are formed by dividing the area inside the window into rectangular blocks by using lines parallel to the edge line. The subarea containing the most edge points (the highest edge point population subarea) is then selected from this group of subareas, and a linear equation is obtained based only on the edge points within the highest edge point population subarea. By thus approximating the desired line, after excluding the data farthest removed from the edge points in the probable area of the line, the edge line can be extracted reliably and quickly.

When there is a wide variation in the position of the edge line, the area of the window must be widened to reliably include the edge line within the window. If mini-subareas, i.e., thin stripes of subareas, are defined within this large window to find the mini-subarea with the highest edge point population, the number of mini-subareas will become extremely large and processing time will increase. In such cases, the primary window is divided into secondary windows that are wider than the subareas but narrower than the primary window. The secondary window containing the edge line is then extracted and divided into rectangular mini-subareas, thereby shortening the overall processing time required.

Furthermore, when the edge line spans between adjacent subareas, the edge line will be obtained based on a small number of edge points, and precision may deteriorate. However, by forming the subareas so that adjacent subareas (or mini-subareas) overlap, the probability of the edge line spanning adjacent subareas (or mini-subareas) is low, and the edge lines can be measured with high precision.

Furthermore, when obtaining the edge points based on the change in brightness, the effects of minute changes in brightness caused by garbage or noise can be eliminated, and the edge line can therefore be accurately extracted, by extracting as edge points only those points at which the change in brightness exceeds a constant threshold level.

It is also possible to obtain the appropriate edge lines by evaluating the appropriateness of an edge line candidate based on whether the distance of each edge point from the edge line is within a predetermined range, eliminating those edge points which are abnormally far from the edge line, and then re-obtaining the edge line based on the coordinates of the remaining edge points.

BRIEF DESCRIPTION OF THE DRAWINGS

The present invention will become more fully understood from the detailed description given below and the accompanying drawings wherein.

DESCRIPTION OF PREFERRED EMBODIMENT

The preferred embodiment of an edge line measuring method according to the present invention is described below with reference to FIGS. 1–3D.

Figure 1:
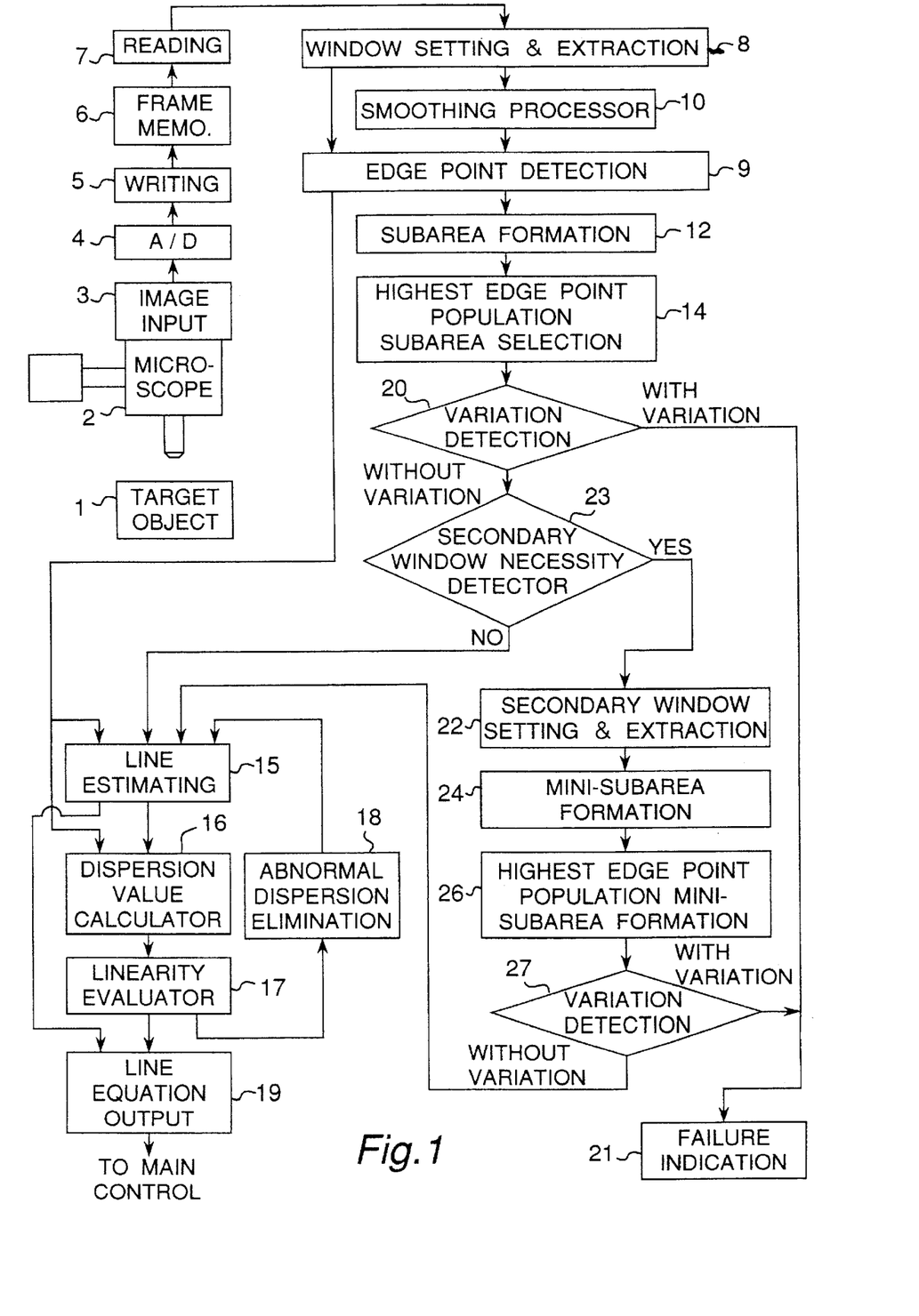
FIG. 1 is a block diagram of an edge line measuring apparatus according to the preferred embodiment of the present invention.

FIG. 1 is a block diagram of an edge line measuring apparatus according to the present invention. As shown in FIG. 1, an image input means 3 is disposed to the eyepiece of a microscope 2 used to capture the edge line of the target object 1 being measured. The image signal that is output by the image input means 3 is then converted into a digital signal by an A/D converter 4, and is then stored in frame memory 6 by writing means 5.

A window setting and extraction means 8 opens a primary window covering an area including a specific edge line of the target object 1 and an area of sufficient size on both sides of the edge line. Once the digital signal is stored in the frame memory 6, the window setting and extraction means 8 extracts from the frame memory 6, via the reading means 7, only specific image data from the image data contained within the primary window. The target object 1 is so arranged that the specific edge line is approximately perpendicular to the scan direction. This orientation of the edge line will be described later.

Based on the specific image data extracted from the frame memory, the edge point detection means 9 then detects the edge points from the change in brightness. Smoothing processor 10 functions to remove extraneous noise below a constant threshold level from the extracted specific image data.

Subarea formation means 12 then divides the area inside the primary window into rectangular subareas in a direction parallel to the edge line.

Based on the coordinate data of each edge point, highest edge point population subarea selection means 14 obtains the total number of edge points in each of the subareas so as to extract the subarea with the highest edge point population.

Line estimating means 15 estimates the location of the edge line using a least-squares method based on the coordinate data of the edge points in the subarea containing the most edge points, and outputs the obtained linear equation data to dispersion value calculator 16.

The dispersion value calculator 16 calculates the distance between each of the edge points and the line drawn according to the linear equation, and outputs the results to linearity evaluator 17.

The linearity evaluator 17 determines whether the line drawn according to the linear equation is within the predetermined linearity tolerance range based on the data from the dispersion value calculator 16. If linearity is not within the tolerance range, the linearity evaluator 17 outputs its determination to the abnormal dispersion elimination means 18. The abnormal dispersion elimination means 18 then eliminates the edge point farthest from the line drawn according to the linear equation, and instructs the line estimating means 15 to reestimate the line based on the coordinate data of the remaining edge points.

When the linearity evaluator 17 determines that the linearity of the line candidate is sufficient, i.e., that the values are within the tolerance range, it outputs its determination to the line equation output means 19, which then outputs the linear equation to the main controller.

Variation detection means, 20 and 27, each detect whether or not the edge points are highly concentrated in the highest edge point population subarea as selected by selection means 14 or 26, or whether or not the edge points are scattered in other subareas. In other words, the variation detection means 20 or 27 detects the variation of the edge points. A secondary window necessity detection means 23 detects whether or not the secondary window should be used.

A secondary window setting and extraction means 22 extracts, from the primary window, a secondary window that is narrower than the primary window, and which contains the edge line. A mini-subarea formation means 24 divides the area inside the secondary window into rectangular mini-subareas in a direction parallel to the edge line. Based on the coordinate data of each edge point, the highest edge point population mini-subarea selection means 26 obtains the total number of edge points in each of the mini-subareas so as to extract the mini-subarea with the highest edge point population.

A sample edge point extraction process is described below wherein the linear equation is obtained by the edge line measuring apparatus.

Figure 2A:
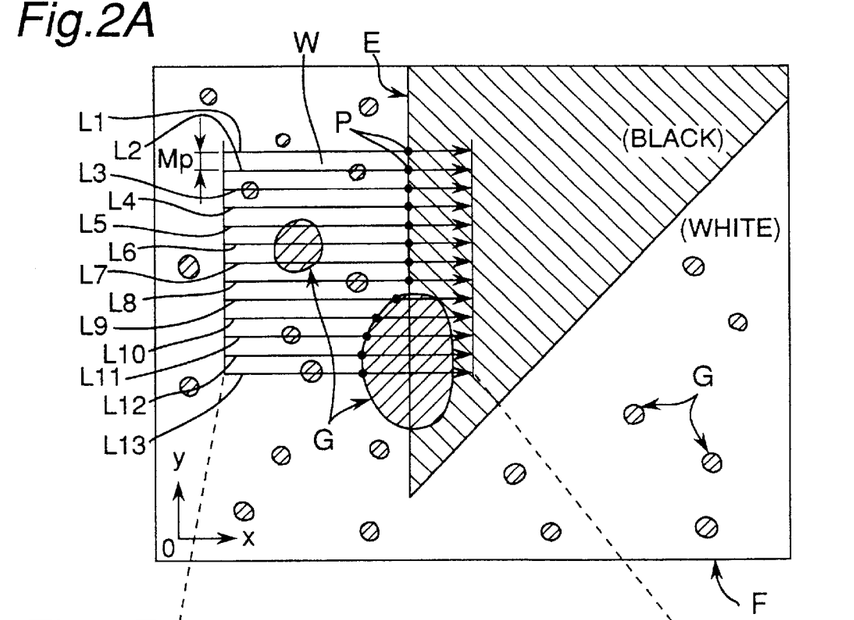
FIGS. 2A and 2B are diagrams used to describe the edge line measuring process of the preferred embodiment.

As shown in FIG. 2A, a window W is opened so as to contain the specific edge line E to be measured. The size and location of this window W is preset relative to the field of view F with consideration given to variations in the position of the target object 1. Note that the present embodiment is described with reference to a situation in which there is little variation in the position of the edge line E, and the window W is therefore not particularly large.

After opening the window W, the window setting and extraction means 8 scans the window W. The scanning includes drawing plural sampling lines at a certain interval Mp and in a direction crossing edge line E as shown in FIG. 2A. Note that there are thirteen sampling lines L1–L13 in this example. The brightness information on these sampling lines is then read from the frame memory 6 by the reading means 7.

Based on this image data, i.e., the brightness information, the edge point detection means 9 detects and obtains coordinates of all points indicating a change from bright to dark in the scanning direction (or dark to bright if the scanning direction is opposite that shown in FIG. 2A), and outputs this data as the specific image data. Possible detection methods include threshold value methods whereby those points exceeding a predetermined threshold value set according to the sampling conditions are obtained, and quadratic differential zero cross methods obtaining the zero cross point after quadratic differentiation.

The smoothing processor 10 removes minute roughness below a constant level, based on the image data, by applying a smoothing method optimized for the sampling conditions. Such methods include applying a low pass filter and methods of multiplex averaging. This process effectively removes data that indicates a change in brightness due to garbage and noise. The smoothing processor 10 can therefore be eliminated in environments not subject to such garbage or noise.

Figure 2B:
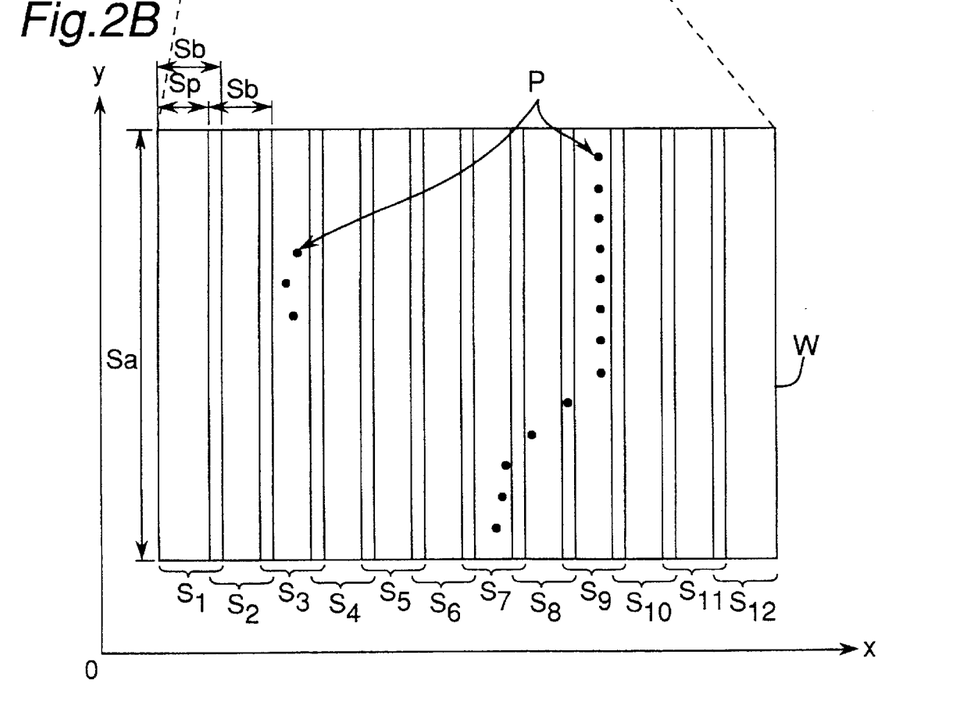

As shown in FIG. 2B, the subarea formation means 12 divides the area inside the window W into areas which are parallel to the edge line and which measure Sa×Sb at a regular offset of Sp in the direction of the sampling lines from the edge line, resulting in subareas S1–S12 in this case. The resulting rectangular subareas S1–S12 are thus formed parallel to the edge line, offset in the scanning direction so that adjacent subareas overlap, and in a size large enough to contain the edge line.

The highest edge point population subarea selection means 14 then counts the total number of edge points P in each subarea and extracts the subarea containing the most edge points. The number of edge points contained in the extracted highest edge point population subarea is defined as Pp. In the example in FIG. 2B, subarea S9 is extracted as the subarea with the highest edge point population, and the edge point number Pp is 8.

Assume that there is no garbage or noise that effects the detection of the edge points, and that all the edge points are properly detected, then all the edge points will be contained in the highest edge point population subarea. Thus, in the above example, since there are 13 sampling lines, the number of edge points contained in the highest edge point population subarea with 100% capturing would be 13. Such a number of edge points, with 100% of the edge points captured by the highest edge point population subarea, is indicated as a maximum edge point number Pt. Actually, due to garbage and noise, the edge point number Pp contained in the highest edge point population area may be much less than the maximum edge point number Pt. Furthermore, the edge point number Pp might not be much different than the number of edge points contained in the second highest edge point population area Ps. In such a case, it is preferable to produce an edge detection failure indication.

The variation detection means 20 detects whether or not the edge point number Pp contained in the highest edge point population subarea is greater than a predetermined rate M % (such as 70%) of the maximum edge point number Pt and, at the same time, detects whether or not a difference between the edge point numbers Pp and Ps is greater than a predetermined rate N % (such as 50%) of the edge point number Pp. In other words, variation detection means 20 detects whether or not the formulas $$Pp > Pt \cdot M/100$$

and $$(Pp-Ps) > Pp \cdot N/100$$

are satisfied. If the above relationships are not satisfied, a detection error, i.e., an edge line detection failure, is indicated. When the above relationships are satisfied, the line estimation at line estimating means 15 is carried out either with the edge point detection using the primary window W or with the edge point detection using a secondary window W2.

Whether to use the secondary window or not is determined by factors such as the variation of the edge lines within the view and the time length permitted to detect the edge line. In the case where the primary window is opened such that it has a relatively wide area, and the primary window is scrutinized with mini-subareas, i.e., thin stripes of subareas, it is possible to accurately obtain the edge line, but it takes a very long time. In such a case, the wide area in the window should be examined with relatively thick stripes of subareas rather than mini-subareas so as to detect roughly where the edge line exits. Once the location of the edge line is roughly determined, the size of the window is reduced and the area in the window is examined with relatively thin stripes of subareas (mini-subareas) to accurately detect the edge line. In this way, the total edge line detection time can be reduced.

For example, in the secondary window necessity detector 23, when the primary window W is set at a size greater than a predetermined size, edge point detection with the secondary window W2 is always performed, and when the primary window W is set at a size smaller than a predetermined size, the edge point detection with the secondary window W2 is omitted.

Figure 3A:
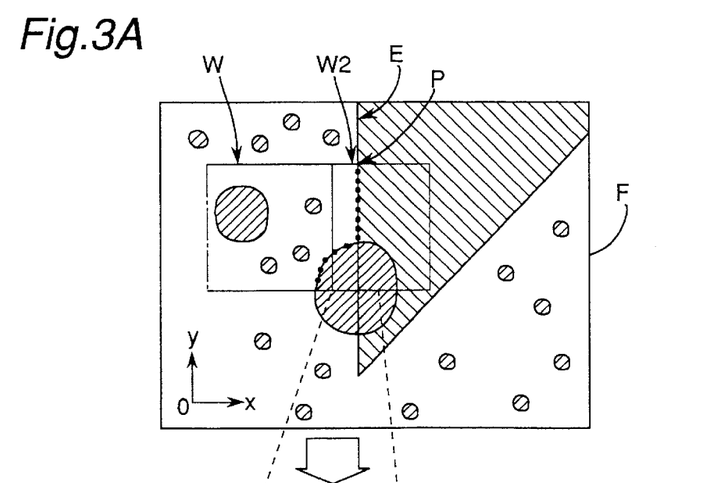
FIGS. 3A, 3B, 3C and 3D are diagrams used to describe the edge line measuring process using secondary windows, according to the preferred embodiment of the present invention.
Figure 3B:
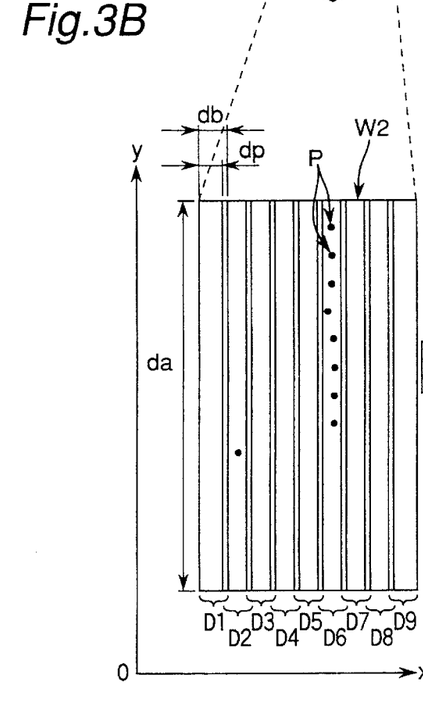

In the example shown in FIGS. 3A–3D, it is assumed that there is a wide variation in the position of the edge line E, and a relatively large primary window is therefore set at first, and then the secondary window is set. Thus, as shown in FIG. 3A, the secondary window setting means 22 cuts out from the primary window W a secondary window W2 large enough to contain the edge line but narrower than the primary window W. Based on the edge point data obtained as described with reference to FIGS. 2A and 2B, the secondary window W2 is set and extracted such that the highest edge point population subarea is contained within the secondary window W2. The selection and extraction of the secondary window W2 can be done in such a manner that the primary window W is divided into a plurality of columns, and selecting one column that has the highest number of edge points as the secondary window W2. The extracted secondary window W2 will reliably contain the edge line.

Then, the secondary window W2 is input as the window data to the mini-subarea formation means 24, the mini-subarea formation means 24 will divide the area inside the secondary window W2 into areas measuring da×db at a regular offset of dp from the edge line in the direction of the sampling lines, and parallel to the edge line, resulting in mini-subareas D1–D9 in this case.

The highest edge point population mini-subarea selection means 26 then counts the total number of edge points P in each mini-subarea and extracts the mini-subarea containing the most edge points. In the example in FIG. 3B, mini-subarea D6 is extracted as the mini-subarea with the highest edge point population. Variation detection means then performs calculations as described above with respect to variation detection means 20.

Figures 3C, 3D:
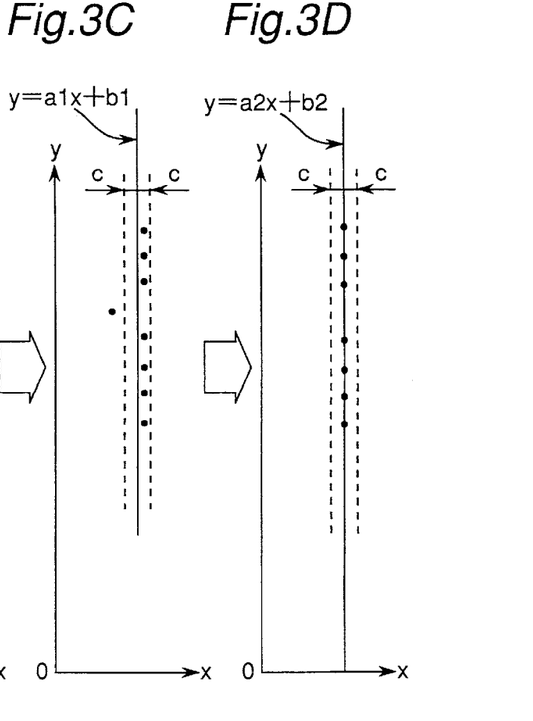

Next, as shown in FIG. 3C, the line estimating means 15 calculates line approximation equation $y=a_1 x+b_1$ using a least squares method based on the coordinate data (such as obtained at the edge point detection means 9) of the edge points inside mini-subarea D6 (or subarea S9 in FIG. 2B). Based on this linear equation, the dispersion value calculator 16 calculates the squares, i.e., the dispersion value, of the distance from the line drawn according to this linear equation to each of the edge points in the extracted subarea. The linearity evaluator 17 then determines whether each dispersion value is within the range of a predetermined value $C^2$. If there is an edge point outside this range of $C^2$, the linearity evaluator 17 determines the line candidate to lack sufficient linearity, and outputs its determination to the abnormal dispersion elimination means 18.

The abnormal dispersion elimination means 18 then deletes the edge point farthest from the approximated line $y=a_1 x+b_1$, and instructs the line estimating means 15 to repeat the line approximation process using the remaining edge points.

After repeating this process as required, a new line $y=a_2 x+b_2$ as shown in FIG. 3D is obtained.

The dispersion value calculator 16 then obtains the dispersion values from this line $y=a_2 x+b_2$ to each of the remaining edge points, and the linearity evaluator 17 repeats the linearity evaluation. When the linearity evaluator 17 determines that the line candidate has sufficient linearity, i.e., that all dispersion values are within the tolerance range $C^2$, it outputs its determination to the line equation output means 19. The line equation output means 19 in turn outputs the linear equation $y=a_2 x+b_2$ to the main controller.

By thus dividing the viewing window into subareas or mini-subareas parallel to the edge line that is to be measured, measuring errors caused by arc-shaped garbage in the vicinity of the edge line can be eliminated, and the position of the edge line can be measured with high precision. In addition, by roughly obtaining the position of a specific edge line by setting and extracting a primary window, and then by setting a small size secondary window at a specific area, the processing time can be reduced.

It is to be noted that when there is a variation in the x or y directions of the position of the edge line to be measured, the present invention is only effective if the slope of the line is restricted to a particular range. This limitation can be satisfied fairly simply in actual working environments by means of a mechanism for positioning the target object with respect to the optical system. It is also possible to add a mechanism for obtaining the approximate position and slope of the edge line by means of pattern matching or a similar method, and then automatically setting the window according to the detected position and slope.

It should also be noted that while the present invention has been described with reference to straight lines, the present invention can also be used to measure arcs and edge lines of other shapes by defining the group of subareas or mini-subareas according to the shape of the edge line being measured.

As will be known from the above description of an edge line measuring method according to the present invention, the area inside the window is divided into a group of rectangular subareas by means of lines parallel to the edge line, the subarea containing the most edge points is selected from this group, and a linear equation is obtained based on the edge points within the selected subarea. As a result, line approximation is accomplished after eliminating the data separated from these edge points, and the edge lines can therefore be extracted reliably and quickly.

Furthermore, by cutting from the primary window a secondary window that is wider than the subarea but narrower than the primary window, and dividing the secondary window into rectangular mini-subareas, it is possible to shorten the overall processing time, even when there is a wide variation in the position of the edge line. In such a case, the size of the primary window must be increased accordingly to reliably include the edge line within the primary window.

Furthermore, by forming the subareas (or mini-subareas) so that adjacent subareas (or mini-subareas) overlap, the probability of the edge line spanning adjacent subareas (or mini-subareas) is reduced, and the edge lines can be measured with high precision.

Furthermore, by extracting, as edge points, only those points at which the change in brightness exceeds a constant threshold level (when the edge points are obtained based on the change in brightness), the effects of minute changes in brightness caused by garbage or noise can be eliminated, and the edge line can therefore be accurately extracted.

It is also possible to obtain the appropriate edge lines by evaluating the appropriateness of an edge line candidate based on whether the distance of each edge point from the edge line is within a predetermined range, eliminating those edge points abnormally far from the edge line, and then re-obtaining the edge line based on the coordinates of the remaining edge points.

From the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An edge line measuring method for detecting an edge line, comprising:

(a) setting a primary window covering an area containing the edge line;

(b) extracting specific image data by scanning the area inside said primary window at a specific interval in a direction crossing the edge line;

(c) detecting a change in brightness in the extracted specific image data in the scanning direction and obtaining coordinates of brightness change points as edge points of the edge line;

(d) forming a plurality of subareas by dividing the area inside said primary window into rectangular blocks at a predetermined pitch such that each of said plurality of subareas is capable of containing the edge line;

(e) selecting a highest edge point population subarea from said plurality of subareas, wherein said highest edge point population subarea is a subarea, among said plurality of subareas, which contains the greatest number of edge points; and (f) estimating an edge line from the coordinates of the edge points in said highest edge point population subarea.

2. An edge line measuring method according to claim 1, further comprising:

(g) setting a secondary window inside said primary window, wherein said secondary window is set such that it is operable to contain the edge line and such that it is narrower than said primary window; and (h) forming a plurality of mini-subareas by dividing the area inside said secondary window into rectangular blocks at a predetermined pitch wherein each of said plurality of mini-subareas is capable of containing the edge line.

3. An edge line measuring method according to claim 1, wherein said subareas are defined such that adjacent subareas overlap.

4. An edge line measuring method according to claim 1, wherein each of said brightness change points is obtained when the detected change in brightness in the extracted specific image data exceeds a predetermined threshold value in the scanning direction.

5. An edge line measuring method according to claim 1, further comprising:

(i) measuring a distance from the estimated edge line to each of the edge points in said highest edge point population subarea and evaluating the appropriateness of the estimated edge line based on whether the distance from the estimated edge line to each of the edge points in said highest edge point population subarea is within a predetermined range; and (j) eliminating an edge point which is farthest from the estimated edge line, and re-estimating the edge line from the coordinates of remaining edge points in said highest edge point population subarea.

6. An edge line measuring method according to claim 2, wherein said mini-subareas are defined such that adjacent mini-subareas overlap.

7. An edge line measuring apparatus for detecting an edge line, comprising:

means for setting a primary window covering an area containing the edge line;

means for extracting specific image data by scanning the area inside said primary window at a specific interval in a direction crossing the edge line;

means for detecting a change in brightness in the extracted specific image data in the scanning direction and obtaining coordinates of brightness change points as edge points of the edge line;

means for forming a plurality of subareas by dividing the area inside said primary window into rectangular blocks at a predetermined pitch such that each of said plurality of subareas is capable of containing the edge line;

means for selecting a highest edge point population subarea from said plurality of subareas, wherein said highest edge point population subarea is a subarea, among said plurality of subareas, which contains the greatest number of edge points; and means for estimating an edge line from the coordinates of the edge points in said highest edge point population subarea.

8. An edge line measuring apparatus according to claim 7, further comprising:

means for setting a secondary window inside said primary window, wherein said secondary window is set such that it contains the edge line and such that it is narrower than the primary window; and means for forming a plurality of mini-subareas by dividing the area inside said secondary window into rectangular blocks at a predetermined pitch such that each of said plurality of mini-subareas is capable of containing the edge line.

* * * * *